United States Patent
Igarashi et al.

(10) Patent No.: US 7,618,728 B2
(45) Date of Patent: Nov. 17, 2009

(54) FUEL CELL SYSTEM AND METHOD OF CONTROLLING IDLE STOP OF THE FUEL CELL SYSTEM

(75) Inventors: Daishi Igarashi, Saitama-ken (JP); Yoshikazu Murakami, Saitama-ken (JP); Junji Uehara, Saitama-ken (JP); Kenichiro Ueda, Saitama-ken (JP); Dai Saitoh, Saitama-ken (JP); Chihiro Wake, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 743 days.

(21) Appl. No.: 11/264,933

(22) Filed: Nov. 2, 2005

(65) Prior Publication Data

US 2006/0093880 A1    May 4, 2006

(30) Foreign Application Priority Data

Nov. 2, 2004   (JP) ............................ 2004-319316
Nov. 26, 2004  (JP) ............................ 2004-343197

(51) Int. Cl.
  *H01M 8/04* (2006.01)
(52) U.S. Cl. .......................................... 429/23; 429/24
(58) Field of Classification Search .................. 429/22, 429/23, 24, 25; 700/286
  See application file for complete search history.

(56) References Cited

U.S. PATENT DOCUMENTS

2004/0013920 A1* 1/2004 Hasuka et al. ................ 429/23
2006/0188764 A1* 8/2006 Nakamura et al. ............ 429/23

FOREIGN PATENT DOCUMENTS

| EP | 1339124 A1 | 8/2003 |
|---|---|---|
| EP | 1410456 B1 | 4/2004 |
| JP | 2001-359204 | 12/2001 |
| JP | 2003-288926 | 10/2003 |
| JP | 2004-152598 | 5/2004 |
| JP | 2004-173450 | 6/2004 |

OTHER PUBLICATIONS

German Office Action for Application No. 102005052019.7-45, dated Aug. 30, 2007.

* cited by examiner

*Primary Examiner*—Stephen J. Kalafut
(74) *Attorney, Agent, or Firm*—Lahive & Cockfield, LLP; Anthony A. Laurentano, Esq.

(57) ABSTRACT

A fuel cell system and an idle stop controlling method for the fuel cell system. The fuel cell system includes: a fuel gas supply means for supplying fuel gas; an oxidant gas supply means for supplying oxidant gas; a fuel cell to which the fuel gas and the oxidant gas are supplied for generation of electricity; an idle stop means for stopping generation of electricity by the fuel cell to perform idle stop; and an unstable state detection means for detecting whether the generation of electricity by the fuel cell is unstable. If the unstable state detection means detects that generation of electricity by the fuel cell is unstable, idle stop by the idle stop means is prohibited so that the fuel cell continues to generate electricity.

13 Claims, 4 Drawing Sheets

FUEL CELL SYSTEM AND METHOD OF CONTROLLING IDLE STOP OF THE FUEL CELL SYSTEM

CROSS REFERENCE TO RELATED APPLICATIONS

This application claims the foreign priority benefit under Title 35, United States Code, §119(a)-(d) of Japanese Patent Application Nos. 2004-319316 and 2004-343197, filed on Nov. 2, 2004 and Nov. 26, 2004 in the Japan Patent Office, the contents of which are hereby incorporated by reference.

BACKGROUND OF THE INVENTION

The present invention relates to an idle stop controlling technique for stopping generation of electricity of a fuel cell system which is mounted on a fuel cell mounted movable body such as automobiles and railroad vehicles.

To improve fuel economy, so-called idle stop control is carried out for a fuel cell vehicle which mounts a fuel cell system. The idle stop control is carried out, for example, by stopping a part of accessories for supplying reaction gas to the fuel cell, such as a compressor, during the stop of the vehicle. For example, Japanese Laid-open Patent Application No. 2001-359204 (see paragraphs [0026] to [0038] and FIGS. 1-5) discloses such idle stop control.

However, even if the fuel cell vehicle stops, idle stop is not preferable in some cases. Japanese Laid-open Patent Application No. 2004-173450 discloses a fuel cell vehicle which determines the cases where idle stop is not preferable and prohibits the stop of supply of reaction gas, namely, prohibits idle stop. In this fuel cell vehicle, electric voltage of each single cell which forms part of the fuel cell is detected, and if the electric voltage lowers, idle stop is prohibited.

In the above fuel cell systems, if the idle stop is carried out during when the operation temperature of the fuel cell is low, acceleration of warming-up operation will be disadvantageously interrupted. This prolongs an unstable cell voltage state, which results in a disadvantage in that response to restart from idling is slow and a smooth running of the fuel cell mounted movable body is impaired. Further, a poor drivability state continues. Idle stop is, however, necessary in terms of improvement in fuel economy.

In view of the above, an object of the present invention is to properly prohibit the idle stop.

SUMMARY OF THE INVENTION

According to the present invention, there is provided a fuel cell system comprising: a fuel gas supply means for supplying fuel gas; an oxidant gas supply means for supplying oxidant gas; a fuel cell to which the fuel gas and the oxidant gas are supplied for generation of electricity; an idle stop means for stopping generation of electricity by the fuel cell to perform idle stop; and an unstable state detection means for detecting whether the generation of electricity by the fuel cell is unstable. In this fuel cell system, if the unstable state detection means detects that generation of electricity by the fuel cell is unstable, idle stop by the idle stop means is prohibited so that the fuel cell continues to generate electricity.

The fuel cell may be mounted on a fuel cell mounted movable body which is driven by electric power of the fuel cell.

According to a first aspect of the aforementioned fuel cell system, the fuel cell system may further comprise a temperature sensing means for detecting an operation temperature of the fuel cell, and the unstable state detection means may carry out a detection in accordance with the operation temperature of the fuel cell that is detected by the temperature sensing means and a first predetermined temperature under which generation of electricity by the fuel cell becomes unstable.

The unstable state detection means may determine that the generation of electricity is unstable if the operation temperature detected by the temperature sensing means is lower than the first predetermined temperature.

In the aforementioned fuel cell system according to the first aspect, the operation temperature of the fuel cell is detected during the idle stop of the fuel cell, and in accordance with the detected operation temperature, the fuel cell is preferentially kept in the electricity generation state from the idle stop state. Therefore, it is possible to improve the fuel cell system so that generation of electricity by the fuel cell does not become unstable.

Since the fuel cell stably generates electricity and the fuel cell mounted movable body can move smoothly, it is possible to keep driving characteristics of the fuel cell mounted movable body and to prevent driveability from being impaired.

According to a second aspect of the aforementioned fuel cell system, the fuel cell includes a plurality of single cells, and the fuel cell system further comprises a voltage sensing means for detecting voltage of each single cell. The unstable state detection means may calculate a first voltage deviation that is a deviation between voltage of one single cell having a low voltage and an average voltage of the single cells, and determine that the generation of electricity is unstable if the first voltage deviation is more than a first threshold value.

Alternatively, the fuel cell includes a plurality of single cells, and the fuel cell system further comprises a voltage sensing means for detecting voltage of each single cell. The unstable state detection means may calculate a second voltage deviation that is a deviation between voltage of one single cell having the highest voltage and voltage of one single cell having the lowest voltage, and determine that the generation of electricity is unstable if the second voltage deviation is more than a second threshold value.

The aforementioned fuel cell system according to the second aspect may further comprise an electricity storage means for storing electric power generated by the fuel cell. The electricity storage means stores electric power from the fuel cell if voltage of the electricity storage means is lower than voltage of the fuel cell.

The electricity storage means may be a capacitor.

In the aforementioned fuel cell system according to the second aspect, it is possible to probe the cause of lowering cell voltage and to appropriately prohibit idle stop. As a result, effective operation of the fuel cell and improvement of fuel economy can be achieved.

According to a third aspect of the aforementioned fuel cell system, the prohibition of idle stop may be released at a time when generation of electricity by the fuel cell becomes stable.

The generation of electricity may be determined as stable at a time when a predetermined time elapses after the prohibition of idle stop is carried out.

Also, the generation of electricity may be determined as stable at a time when a predetermined number of purging is carried out after the prohibition of idle stop is carried out.

Further, the generation of electricity may be determined as stable at a time when an operation, by which at least one of the fuel gas and the oxidant gas is supplied to the fuel cell to an amount larger than a normal supply amount, is carried out for a predetermined period of time after the prohibition of idle stop is carried out.

In the aforementioned fuel cell system according to the third aspect, it is possible to release the prohibition of idle stop at an appropriate timing.

Further, according to the present invention, there is provided a method of controlling idle stop of a fuel cell system, which includes: a fuel gas supply means for supplying fuel gas; an oxidant gas supply means for supplying oxidant gas; a fuel cell to which the fuel gas and the oxidant gas are supplied for generation of electricity; and an idle stop means for stopping generation of electricity by the fuel cell to perform idle stop. The method comprises the steps of: a first step for detecting whether the generation of electricity by the fuel cell is unstable; and a second step for prohibiting idle stop by the idle stop means, if the unstable state detection means detects that generation of electricity by the fuel cell is unstable, so that the fuel cell continues to generate electricity.

According to a first aspect of the aforementioned controlling method, the fuel cell system further comprises a temperature sensing means for detecting an operation temperature of the fuel cell, and a detection may be carried out in the first step in accordance with the operation temperature of the fuel cell that is detected by the temperature sensing means and a first predetermined temperature under which generation of electricity by the fuel cell becomes unstable.

In the aforementioned controlling method according to the first aspect, the operation temperature of the fuel cell is detected during the idle stop of the fuel cell, and in accordance with the detected operation temperature, the fuel cell is preferentially kept in the electricity generation state from the idle stop state. Therefore, it is possible to improve the fuel cell system so that generation of electricity by the fuel cell does not become unstable.

Since the fuel cell stably generates electricity and the fuel cell mounted movable body can move smoothly, it is possible to keep driving characteristics of the fuel cell mounted movable body and to prevent driveability from being impaired.

According to a second aspect of the aforementioned controlling method, the fuel cell includes a plurality of single cells, and the fuel cell system further comprises a voltage sensing means for detecting voltage of each single cell. The first step may further comprise the steps of: calculating a first voltage deviation that is a deviation between voltage of one single cell having a low voltage and an average voltage of the single cells; and determining that the generation of electricity is unstable if the first voltage deviation is more than a first threshold value.

Alternatively, the fuel cell includes a plurality of single cells, and the fuel cell system further comprises a voltage sensing means for detecting voltage of each single cell. The first step may further comprise the steps of: calculating a second voltage deviation that is a deviation between voltage of one single cell having the highest voltage and voltage of one single cell having the lowest voltage; and determining that the generation of electricity is unstable if the second voltage deviation is more than a second threshold value.

In the aforementioned controlling method according to the second aspect, the fuel cell system may further comprise an electricity storage means for storing electric power generated by the fuel cell. The electricity storage means stores electric power from the fuel cell if voltage of the electricity storage means is lower than voltage of the fuel cell.

In the aforementioned controlling method according to the second aspect, it is possible to probe the cause of lowering cell voltage and to appropriately prohibit idle stop. As a result, effective operation of the fuel cell and improvement of fuel economy can be achieved.

Other features and advantages of the present invention will be apparent from the following description.

BRIEF DESCRIPTION OF THE DRAWINGS

The aspects of the present invention will become more apparent by describing in detail illustrative, non-limiting embodiments thereof with reference to the accompanying drawings, in which.

DETAILED DESCRIPTION OF THE INVENTION

With reference to the accompanying drawings, first and second embodiments of the present invention will be described below. In the following embodiments, description will be given to a fuel cell vehicle as an example of a fuel cell mounted movable body. Although description will be omitted, as long as idle stop control is performed, the present invention may also be adapted to railroad vehicles, ships, etc. or to other installation-type equipments which take out power from electric power generated by a fuel cell.

In the first and second embodiments, unstable state detection means is comprised of ECU. However, the present invention is not limited to this specific embodiment.

First Embodiment

Construction of Fuel Cell Vehicle

Figure 1:
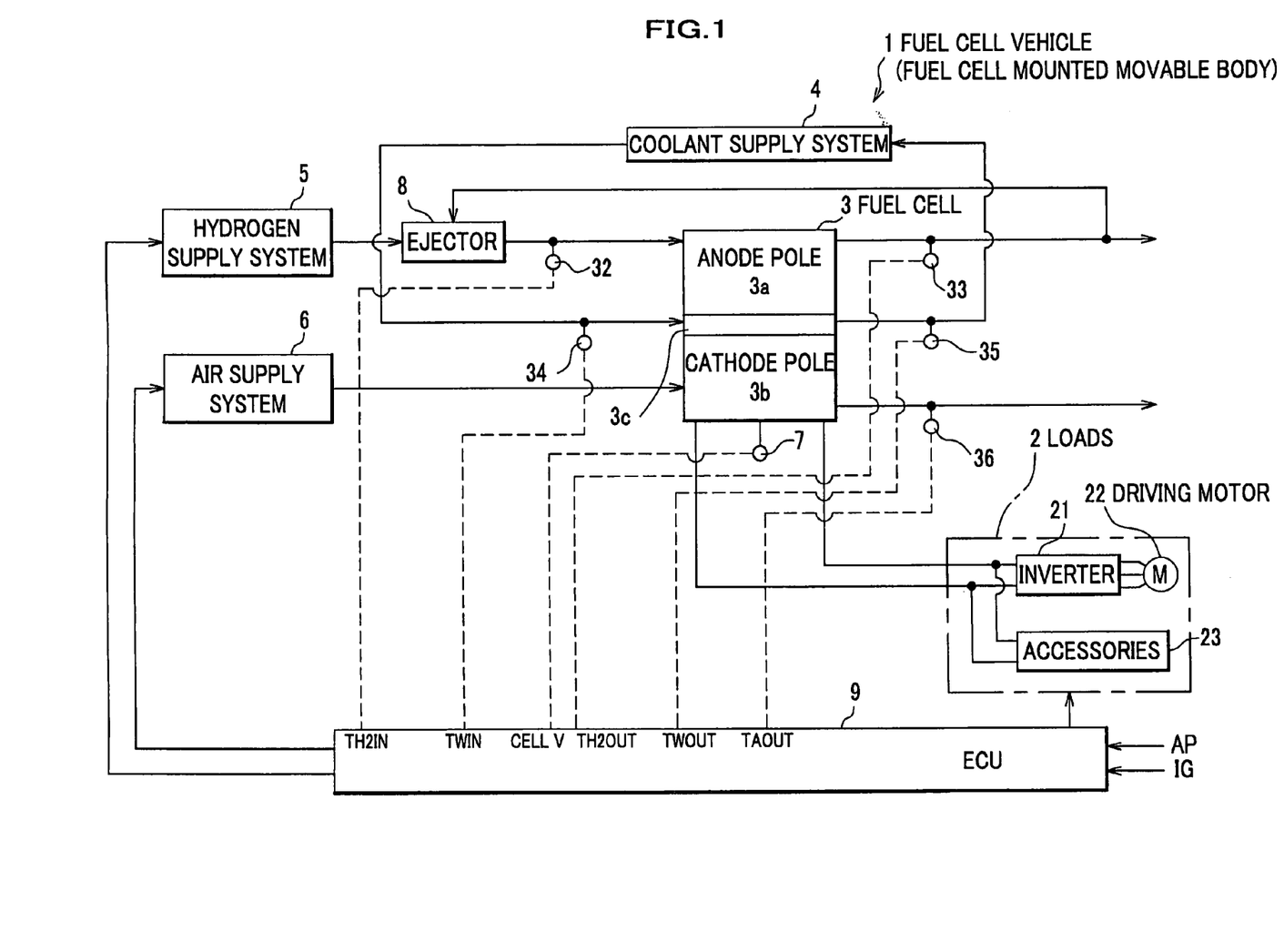
FIG. 1 is a block diagram explaining the construction of a fuel cell vehicle according to a first embodiment.

With reference to the block diagram shown in FIG. 1, the construction of a fuel cell vehicle 1 will be described.

The fuel cell vehicle 1 includes loads 2 as a source of power to move a vehicle body (not shown), a fuel cell 3 which supplies electric power to the loads 2, a coolant supply system 4 which supplies coolant to the fuel cell 3, a hydrogen supply system 5 which supplies hydrogen to the fuel cell 3, and an air supply system 6 which supplies air to the fuel cell 3.

The fuel cell vehicle 1 also includes temperature sensing means for detecting an operation temperature of the fuel cell 3 (inlet hydrogen temperature sensor 32, outlet hydrogen temperature sensor 33, inlet water temperature sensor 34, outlet water temperature sensor 35, and outlet air temperature sensor 36).

The fuel cell vehicle 1 includes a cell voltage detector 7 and an ejector 8.

Further, the fuel cell vehicle 1 is provided with ECU (Electronic Control Unit) 9. ECU 9 is connected to the loads 2, the fuel cell 3, the coolant supply system 4, the hydrogen supply system 5, and the air supply system 6 by signal line, and communicates (sends or receives data) therewith to control the entire system as well as to determine whether idle stop should be carried out.

Loads

Loads 2 are a source of power which expends electric power supplied from the fuel cell 3 and move the fuel cell vehicle 1. The loads 2 include an inverter 21, a driving motor 22, and accessories 23.

The inverter 21 is electrically connected to the driving motor 22. The inverter 21 converts electric power that is supplied from the fuel cell 3 from direct current to alternate current and supplies it to the driving motor 22.

The driving motor 22 rotates by electric power supplied from the inverter 21, and transmits driving force to wheels (not shown) through a transmission (not shown) and the like so as to move the fuel cell vehicle 1.

Accessories 23 are connected to the fuel cell 3 in such a manner as to be parallel to the inverter 21, and expend electric power. Accessories 23 are electric equipments, such as electronic products including head light, and ECU.

Fuel Cell

The fuel cell 3 consists of a plurality of laminated cells as a stack, and each cell includes an anode pole 3a, a cathode pole 3b, and a solid polymer electrolyte membrane 3c sandwiched between the anode pole 3a and the cathode pole 3b. The construction of the fuel cell 3 is schematically shown in FIG. 1. Hydrogen is fed to the anode pole 3a of the fuel cell 3 through the hydrogen supply system 5, and air is fed to the cathode pole 3b of the fuel cell 3 through the air supply system 6. Further, coolant is fed to the fuel cell 3 through the coolant supply system 4.

When hydrogen and air are supplied to the fuel cell 3 as reaction gas from the hydrogen supply system 5 and the air supply system 6, hydrogen is ionized at a reaction surface (not shown) of the anode pole 3a and migrates to the cathode pole 3b through the polymer electrolyte membrane 3c. Electrons thus generated are taken out and fed to the loads 2 as electric power of direct current.

Temperature Sensing Means

As described previously, temperature sensing means includes the inlet hydrogen temperature sensor 32, the outlet hydrogen temperature sensor 33, the inlet water temperature sensor 34, the outlet water temperature sensor 35, and the outlet air temperature sensor 36. Relations between temperature detected by each of the sensors and operation temperature of the fuel cell 3 are previously obtained by experiments and the like. As described later, ECU 9 controls idle stop based on the relations between a detected value of each sensor and the operation temperature under which the fuel cell 3 stops idling. Description will be given to each sensor.

The inlet hydrogen temperature sensor 32 detects temperature TH2IN of hydrogen that is supplied from the hydrogen supply system 5 and flows into the inlet of the fuel cell 3. Part of hydrogen discharged from the outlet of the fuel cell 3 flows into the ejector 8 and then again into the inlet of the fuel cell 3. For this reason, the temperature TH2IN varies in accordance with the operation temperature of the fuel cell 3. To be more specific, when the warming-up of the fuel cell 3 is not sufficient, temperature of hydrogen is low. The operation temperature of the fuel cell 3 can be specified by detecting temperature of hydrogen at the inlet. Therefore, the operation temperature of the fuel cell 3 can be specified from the temperature TH2IN.

The outlet hydrogen temperature sensor 33 detects temperature TH2OUT of hydrogen that is discharged from the outlet of the fuel cell 3. The temperature TH2OUT varies in accordance with the operation temperature of the fuel cell 3, and thus can be used to specify the operation temperature of the fuel cell 3.

The inlet water temperature sensor 34 detects temperature TWIN of coolant that is supplied from the coolant supply system 4 and flows into the inlet of the fuel cell 3. In the case where coolant discharged from the outlet of the fuel cell 3 returns to the coolant supply system 4 and is cooled before being supplied to the fuel cell 3, if the cooling capacity of the coolant supply system 4 is unchanged, the temperature TWIN varies in accordance with the operation temperature of the fuel cell 3. When the warming-up of the fuel cell 3 is not sufficient, temperature of coolant is low. The operation temperature of the fuel cell 3 can be specified by detecting temperature of coolant at the inlet. Therefore, the operation temperature of the fuel cell 3 can be specified from the temperature TWIN.

The outlet water temperature sensor 35 detects temperature TWOUT of coolant that flows inside of the fuel cell 3 and is discharged from the outlet. The temperature TWOUT also varies in accordance with the operation temperature of the fuel cell 3, and thus can be used to specify the operation temperature of the fuel cell 3.

The outlet air temperature sensor 36 detects temperature TAOUT of air that is supplied from the air supply system 6 and flows through the fuel cell and is discharged from the outlet. The temperature TAOUT also varies in accordance with the operation temperature of the fuel cell 3, and thus can be used to specify the operation temperature of the fuel cell 3.

Although five temperature sensing means, such as the inlet hydrogen temperature sensor 32, the outlet hydrogen temperature sensor 33, the inlet water temperature sensor 34, the outlet water temperature sensor 35, and the outlet air temperature sensor 36, are employed in this embodiment, it may be possible to detect at lest one temperature obtained by any of these sensors.

For this reason, the following description is particularly given to the case where the operation temperature of the fuel cell 3 is specified from the temperature TWOUT that is the temperature of coolant detected by the outlet water temperature sensor 35. However, the operation temperature can be specified from one of the other temperatures TH2IN, TH2OUT, TWIN and TAOUT, and detailed description thereon will be omitted.

Further, instead of specifying the operation temperature based on any one of the above temperatures, at least two of these temperatures may be used to determine whether idle stop should be carried out.

Supply Systems for Coolant, Hydrogen, and Air

The coolant supply system 4 circulates and supplies coolant for cooling the fuel cell 3. The coolant supply system 4 includes cooling means (not shown) for cooling the coolant that is circulated and returned from the fuel cell 3, and a cooling pump (not shown). Cooling medium is not limited to coolant or cooling water as long as it can cool the fuel cell 3.

The hydrogen supply system 5 supplies hydrogen to the anode pole 3a of the fuel cell 3. The hydrogen supply system 5 is equipped with a high pressure hydrogen storage tank (not shown) for storing hydrogen at high pressures.

Of all hydrogen discharged from the fuel cell 3, hydrogen that is not returned to the ejector 8 is mixed with air that is discharged from the fuel cell 3 at a diluting box (not shown) to decrease the concentration, and discharged to the external air.

The air supply system 6 supplies air (oxygen) as an oxidant to the cathode pole 3b of the fuel cell 3. The air supply system 6 is equipped with an air compressor (not shown).

Cell Voltage Detector and Ejector

The cell voltage detector 7 detects the voltage of each of the plurality of cells that form part of the fuel cell 3. Detected cell voltages are monitored by ECU 9.

According to the present invention, as described later, since the ECU 9 controls the idle stop state in accordance with the operation temperature of the fuel cell 3, it is possible to prevent the cell voltage of the whole fuel cell 3 from being unstable. Therefore, cell voltages detected by the cell voltage detector 7 can be used as references for detecting whether ECU 9 normally controls the idle stop. ECU 9 does not stop idling when the cell voltage of the fuel cell 3 is unstable.

The ejector 8 collects hydrogen that has not been consumed by generation of electricity at the fuel cell 3. The ejector 8 is employed for the purpose of improving the utilization rate of hydrogen.

As previously described, ECU (controller (idle stop means; unstable state detection means)) 9 determines whether or not the idle stop should be carried out. ECU 9 executes the following steps.

ECU 9 monitors the output of the cell voltage detector 7, and executes a step of determining whether or not the fuel cell 3 is generating electricity.

ECU 9 also receives signals for the accelerator pedal opening degree AP, and opening and closing of the ignition switch IG, and based on these signals, ECU 9 executes a step of determining whether or not an idle stop request exists.

Further, ECU 9 executes a step of monitoring, for example, the temperature TWOUT detected by the temperature sensing means such as the outlet water temperature sensor 35 as the operation temperature of the fuel cell 3.

ECU 9 further reads out a threshold value of the operation temperature (first predetermined temperature) from a memory (not shown). The first predetermined temperature is the minimum temperature that is required for stable generation of electricity by the fuel cell 3. In this embodiment, the first predetermined temperature is set as a temperature associated with the temperature TWOUT detected by the outlet water temperature sensor 35.

Idle Stop Control

Figure 2:
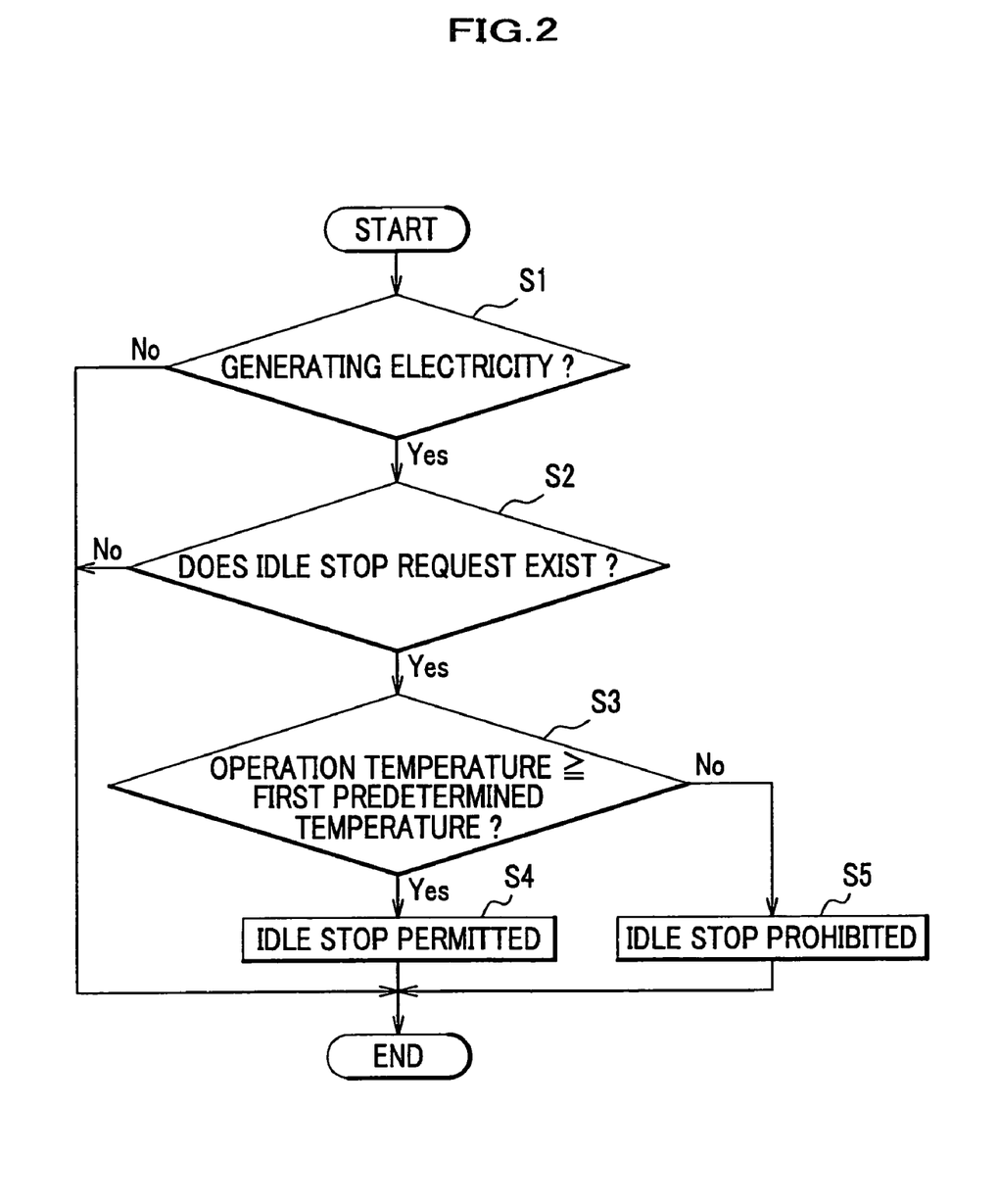
FIG. 2 is a flow chart explaining processes for idle stop control made by ECU of FIG. 1.

With reference to the flow chart of FIG. 2 and partly to FIG. 1, processes of the idle stop control performed by ECU 9 will be described below.

ECU 9 monitors the output of the cell voltage detector 7, and determines whether or not the fuel cell 3 is generating electricity (S1). If the fuel cell 3 is generating electricity (S1; Yes), ECU 9 determines whether or not an idle stop request exists (S2). Signals such as the accelerator pedal opening degree AP and the brake signal can be used as an idle stop request signal. For example, when the accelerator pedal is not depressed and the vehicle speed is 0 km/h with the brake switch being ON, idle stop may be performed.

If an idle stop request exists (S2; Yes), ECU 9 then determines whether or not the operation temperature is not lower than the first predetermined temperature (operation temperature≧first predetermined temperature) (S3). If the temperature TWOUT (operation temperature) detected by the outlet water temperature sensor 35 is not lower than the first predetermined temperature (S3; Yes), ECU sends an idle stop permission order and makes the fuel cell 3 become an idle stop state (S4). If the temperature TWOUT (operation temperature) detected by the outlet water temperature sensor 35 is lower than the first predetermined temperature (S3; No), ECU 9 sends an idle stop prohibition order and prohibits the idle stop of the fuel cell 3 (S5). ECU 9 makes the fuel cell 3 become the electricity generation state in preference to the idle stop control. This can expedite a warming-up of the fuel cell 3 so that the fuel cell vehicle 1 can move smoothly.

If the fuel cell 3 is not generating electricity (S1; No), ECU 9 determines that the fuel cell 3 is in an idle stop state and completes the process. Further, if the idle stop request does not exist (S2; No), since the fuel cell 3 is generating electricity (S1; Yes) and the fuel cell vehicle 1 is running, ECU 9 completes the process.

Second Embodiment

In a fuel cell system equipped with a fuel cell, loads, and an electricity storage means (battery, capacitor or the like), voltage of single cells that form part of the fuel cell drops by the following two causes (cause 1 and cause 2). Idle stop control can be prohibited properly if these causes are determined.

To be more specific, voltage (cell voltage) is different between a single cell whose electric poles are supplied with sufficient reaction gas (fuel gas, oxidant gas) and a single cell whose electric poles are supplied with insufficient reaction gas. In a single cell whose electric poles are supplied with insufficient reaction gas, voltage is relatively low. For example, if the electric pole(s) of a single cell is covered with water, supply of reaction gas to the electrode becomes insufficient and the voltage of the single cell lowers. This is classified into Cause 1. Normally, water is discharged from the single cell by an air flow of the supplied reaction gas.

However, when the idle stop is carried out and supply of the reaction gas is stopped, water is not discharged by the air flow of the supplied reaction gas. Because reaction gas remaining within the single cell reacts slightly to produce water, although in a slight amount, the electric pole(s) may be further covered with water. This leads to a further decrease of the cell voltage, and therefore a malfunction of the fuel cell upon completing the idle stop and restarting the fuel cell. Decrease of voltage due to insufficient supply of the reaction gas, especially resulting from water covering over the electrode(s), arises mostly for individual single cells.

Meanwhile, if the fuel cell system is equipped with an electricity storage means to which electricity is stored by the fuel cell, decrease of the cell voltage may arise other than the above cause, for example, due to electric charge to the electricity storage means. This is classified into Cause 2. Decrease of the cell voltage by means of the electricity storage means does not arise in a particular single cell and rather arises in all the single cells.

According to this embodiment, such a difference, that is, the normal voltage decrease (Cause 2) and the abnormal voltage decrease (Cause 1) are distinguished based on a voltage deviation (first voltage deviation) between voltage of one single cell having a low voltage and the average voltage of the single cells or a voltage deviation (second voltage deviation) between voltage of one single cell having the highest voltage and voltage of one single cell having the lowest voltage, and the idle stop can be prohibited appropriately in consideration of the distinction result. Therefore, an error in prohibition of idling stop can be restricted, which leads to an improvement in fuel economy.

A fuel cell system according to the second embodiment will be described below.

Figure 3:
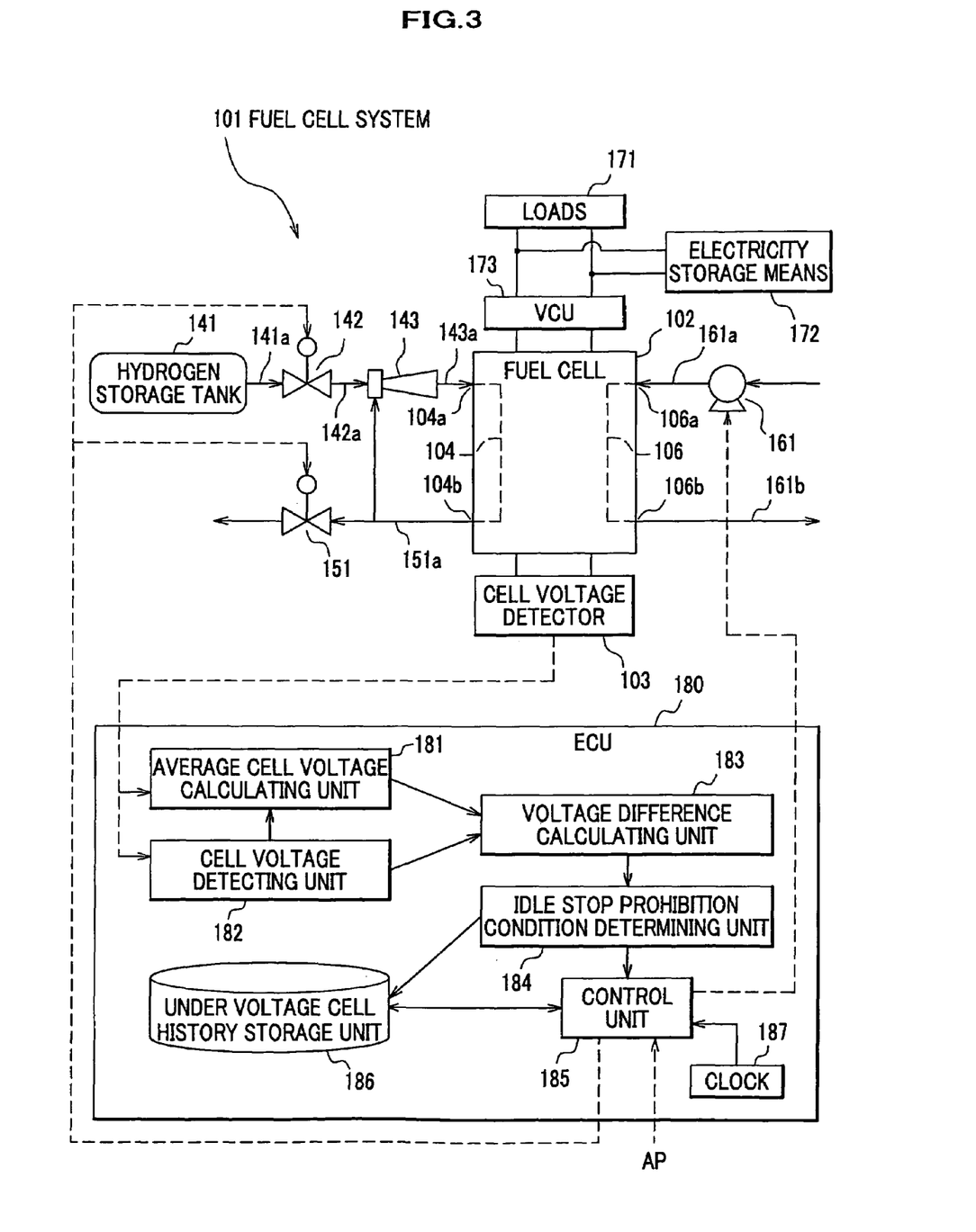
FIG. 3 is a block diagram showing a fuel cell system according to a second embodiment.

As shown in FIG. 3, the fuel cell system 101 according to this embodiment is mounted on a fuel cell vehicle. The fuel cell system 101 prohibits idle stop when a difference between the average cell voltage and the lowest cell voltage is more than a first threshold value (predetermined value).

The fuel cell system 101 mainly consists of a fuel cell 102, a cell voltage detector 103 for detecting voltage of each single cell of the fuel cell 102, an anode system for supplying/discharging hydrogen gas as fuel gas to/from the anode of the fuel cell 102, a cathode system for supplying/discharging air as oxidant gas to/from the cathode of the fuel cell 102, an electricity storage means 172 which assists generation of electricity by decreasing load fluctuation caused by the generation of electricity of the fuel cell 102, loads 171 which expends electric power generated by the fuel cell 102 or electric power stored in the electricity storage means 172, and a controller (ECU) 180 for controlling them. The fuel cell system 101 drives loads 171 by electric power generated by the fuel cell 102 and electric power stored in the electricity storage means 172.

Fuel Cell

The fuel cell 102 mainly consists of a plurality of single cells, each of which includes an anode (fuel pole), a cathode (air pole), and an electrolyte membrane sandwiched between the anode and the cathode. These single cells are laminated as a stack through separators. Each of the separators includes a groove for feeding reaction gas to the whole surface of the electrolyte membrane (fuel pole; air pole), a through-hole for feeding reaction gas to each single cell, and the like, which function as an anode-side flow path 104 and a cathode-side flow path 106. Hydrogen gas as fuel gas flows through the anode-side flow path 104 so as to be fed to the anode of each single cell, and air as oxidant gas flows through the cathode-side flow path 106 so as to be fed to the cathode of each single cell.

When hydrogen is supplied to each anode and air is supplied to each cathode, electrochemical reaction occurs between each anode and cathode to thereby generate a certain potential difference at each single cell. Since these single cells are connected in series, large electric power can be taken out from the fuel cell 102.

Cell Voltage Detector

A cell voltage detector (voltage detecting means) 103 is provided to detect voltage (cell voltage) of each single cell. The cell voltage detector 103 is electrically connected to an average cell voltage calculating unit 181 and a cell voltage detecting unit 182 of ECU 180 to be described later. The obtained cell voltages are transmitted to the average cell voltage calculating unit 181 and the cell voltage detecting unit 182.

Anode System

Anode system is arranged on the anode-side of the fuel cell 102 to supply and discharge hydrogen gas. The anode system mainly includes a hydrogen storage tank 141 for storing hydrogen gas, a shut-off valve (accessories) 142, an ejector 143, and a purge valve 151.

Description will be first given to the hydrogen gas supply side (fuel gas supply means). The hydrogen storage tank 141 is connected to the shut-off valve 142 through piping 141*a*. The shut-off valve 142 is positioned downstream of the hydrogen storage tank 141, and connected to the ejector 143 through piping 142*a*. The shut-off valve 142 is electrically connected to a control unit 185 of ECU 180, and shuts off the supply of hydrogen at an appropriate timing by the order from the control unit 185. The ejector 143 is connected to a hydrogen inlet 104*a* of the fuel cell 102 through piping 143*a*. Therefore, hydrogen gas flows from the hydrogen storage tank 141 to the anode-side flow path 104 within the fuel cell 102 via the shut-off valve 142 and the ejector 143.

Next, description will be given to the hydrogen gas discharge side. A purge valve 151 is connected to a hydrogen outlet 104*b* that is in communication with the anode-side flow path 104 through piping 151*a*. The piping 151*a* is branched off at an intermediate between the purge valve 151 and the hydrogen outlet 104*b* and is connected to the ejector 143. The purge valve 151 is electrically connected to the control unit 185 of ECU 180. When the fuel cell 102 generates electricity, the purge valve 151 is closed by the order from the control unit 185, so that hydrogen (anode off-gas; fuel gas) discharged from the fuel cell 102 is returned to the hydrogen supply side. Such a circulation of hydrogen enables effective use of hydrogen gas. Meanwhile, when moisture within anode off-gas increases due to generation of electricity, the purge valve 151 is open by the order from the control unit 185 so that the anode-off gas having high moisture content can be discharged (purged) from the system.

Cathode System

Cathode system is arranged on the cathode-side of the fuel cell 102 to supply and discharge air. The cathode system mainly includes a compressor (accessories) 161.

Description will be first given to the oxidant gas supply side (oxidant gas supply means). The compressor 161 is connected to an air inlet 106*a* of the fuel cell 102 through piping 161*a*. The compressor 106*a* takes in the external air and supplies air to the cathode-side flow path 106. The compressor 161 is electrically connected to the control unit 185 of ECU 180, so that the control unit 185 can control the rotational speed of the compressor 161 and the like to control the amount of air (oxidant gas) supplied to the fuel cell 102.

A humidifier (not shown) is arranged in the piping 161*a*. The humidifier humidifies air supplied to the fuel cell 102.

Next, description will be given to the air discharge side. Piping 161*b* is connected to an air outlet 106*b* of the fuel cell 102 that is in communication with the cathode-side flow path 106. Therefore, air (cathode-off gas; oxidant gas) discharged from the fuel cell 102 can be discharged from the system through the piping 161*b*.

Electric power generated by the fuel cell 102 is supplied to an electricity storage means 172 or loads 171 through a current limiter (VCU) 173. VCU 173 limits the output of the fuel cell 102 according to necessary, and supplies electric power to the electricity storage means 172 or loads 171.

The electricity storage means 172 is, for example, an electric double layer capacitor. The electricity storage means 172 stores electricity generated by the fuel cell 102 if the voltage of the electricity storage means 172 is lower than the voltage of the fuel cell 102. The electricity storage means 172 is connected to loads 171 through the VCU 173 so as to supply electric power to the loads 171 or to assist generation of electricity by the fuel cell 102 according to necessity. The electricity storage means 172 is electrically connected to the control unit 185 of ECU 180, so that information on the amount of stored electricity of the electricity storage means 172 is transmitted to the control unit 185.

Loads 171 include, for example, a motor, an air conditioner, a car navigation system, etc. Loads 171 are electrically connected to the control unit 185, and information on the loads 171 is transmitted to the control unit 185.

ECU

ECU (controller (unstable state detection means)) 180 mainly functions: to control generation of electricity by the fuel cell 102; to determine whether or not an unusual single cell exists within the fuel cell 102; to prohibit operation of the shut-off valve 142 or the compressor 161 in the fuel cell system 101 under predetermined idle stop conditions so as to prevent or restrict electric power consumption thereof; and to save reaction gas. ECU 180 mainly consists of a CPU, a ROM, a RAM, various interfaces, and electronic circuits. ECU 180 further includes an average cell voltage calculating unit 181, a cell voltage detecting unit 182, a voltage difference calculating unit 183, an idle stop prohibition condition determining unit 184, the control unit 185, an under voltage cell history storage unit 186, and a clock 187.

ECU 180 cooperates with the accelerator pedal AP of the fuel cell vehicle.

Average Cell Voltage Calculating Unit

The average cell voltage calculating unit 181 is electrically connected to the cell voltage detector 103, the cell voltage detecting unit 182, and the voltage difference calculating unit 183, respectively. In this embodiment, the average cell voltage calculating unit 181 sums up all the cell voltages inputted from the cell voltage detector 103 by the order from the cell voltage detecting unit 182, and divides the total value by the number of whole single cells to calculate the average cell voltage. The obtained average cell voltage is transmitted to the voltage difference calculating unit 183.

Cell Voltage Detecting Unit

The cell voltage detecting unit 182 is electrically connected to the cell voltage detector 103, the average cell voltage calculating unit 181, and the voltage difference calculating unit 183. The cell voltage detecting unit 182 monitors each of the cell voltages detected by the cell voltage detector 103. The cell voltage detecting unit 182 compares each of the cell voltages transmitted from the cell voltage detector 103, detects a cell indicating the lowest voltage value, and obtains the voltage value (lowest cell voltage) of this cell. The cell voltage detecting unit 182 further determines whether the lowest cell voltage is not more than a predetermined value (lowest cell voltage≦predetermined value). If the lowest cell voltage is not more than the predetermined value, the cell voltage detecting unit 182 sends an order for the calculation of the average cell voltage to the average cell voltage calculating unit 181, and transmits the lowest cell voltage to the voltage difference calculating unit 183. If the lowest cell voltage is more than the predetermined value, the cell voltage detecting unit 182 keeps on monitoring.

Voltage Difference Calculating Unit

The voltage difference calculating unit 183 is electrically connected to the average cell voltage calculating unit 181, the cell voltage detecting unit 182, and the idle stop prohibition condition determining unit 184. The voltage difference calculating unit 183 calculates a voltage difference (first voltage deviation) that is a difference between the average cell voltage calculated by the average cell voltage calculating unit 181 and the lowest cell voltage detected by the cell voltage detecting unit 182, and transmits the obtained voltage difference to the idle stop prohibition condition determining unit 184.

Idle Stop Prohibition Condition Determining Unit

The idle stop prohibition condition determining unit 184 is electrically connected to the voltage difference calculating unit 183, the under voltage cell history storage unit 186, and the control unit 185. The idle stop prohibition condition determining unit 184 compares the voltage difference (first voltage difference) transmitted from the voltage difference calculating unit 183 with the first threshold value, and if the voltage difference is more than the first threshold value (first voltage difference>first threshold value), the idle stop prohibition condition determining unit 184 determines that the cell voltage has lowered because of Cause 1. The idle stop prohibition condition determining unit 184 then transmits whether or not a cell indicating voltage drop exists (under voltage cell history) to the under voltage cell history storage unit 186. If the voltage difference is not more than the first threshold value (first voltage difference≦first threshold value), the idle stop prohibition condition determining unit 184 determines that the cell voltage has lowered because of Cause 2, and sends to the control unit 185 an order for determining whether or not the idle stop prohibition conditions are satisfied.

Control Unit

The control unit 185 is electrically connected to the shut-off valve 142 positioned at the anode-side, the purge valve 151, the compressor 161 positioned at the cathode-side, etc. According to necessity, the control unit 185 controls opening and closing of the shut-off valve 142 and the purge valve 151, operation of the compressor 161 (rotational speed), and the like.

Further, the control unit 185 is electrically connected to the accelerator pedal AP, and detects information on the state of the accelerator pedal AP, so that based on the information the control unit 185 determines the idle stop prohibition conditions and the idle stop permission conditions. The control unit 185 controls opening and closing of the shut-off valve 142, the rotational speed of the compressor 161, etc. based on the determination result.

To be more specific, the idle stop prohibition conditions may include "the output of the accelerator pedal AP is detected". The idle stop permission conditions may include, for example, "the output of the accelerator pedal AP is not detected" or "purging has been completed".

Further, the control unit 185 is connected to the idle stop prohibition condition determining unit 184, the under voltage cell history storage unit 186, and the clock 187. The control unit 185 stores a certain control program. Executing the program allows the control unit 185 to control the shut-off valve 142, the purge valve 151, and the compressor 161.

Under Voltage Cell History Storage Unit

The under voltage cell history storage unit 186 is electrically connected to the idle stop prohibition condition determining unit 184 and the control unit 185.

The under voltage cell history storage unit 186 stores the under voltage cell history transmitted from the idle stop prohibition condition determining unit 184.

Further, the under voltage cell history storage unit 186 transmits to the control unit 185 whether or not the under voltage cell history exists according to a request from the control unit 185, or deletes the under voltage cell history that has been stored according to a request from the control unit 185.

Clock

The clock 187 is electrically connected to the control unit 185, and counts time. For example, the clock 187 starts to count time at the start of purging and completes it at the end of purging, and transmits the time to the control unit 185.

Figure 4:
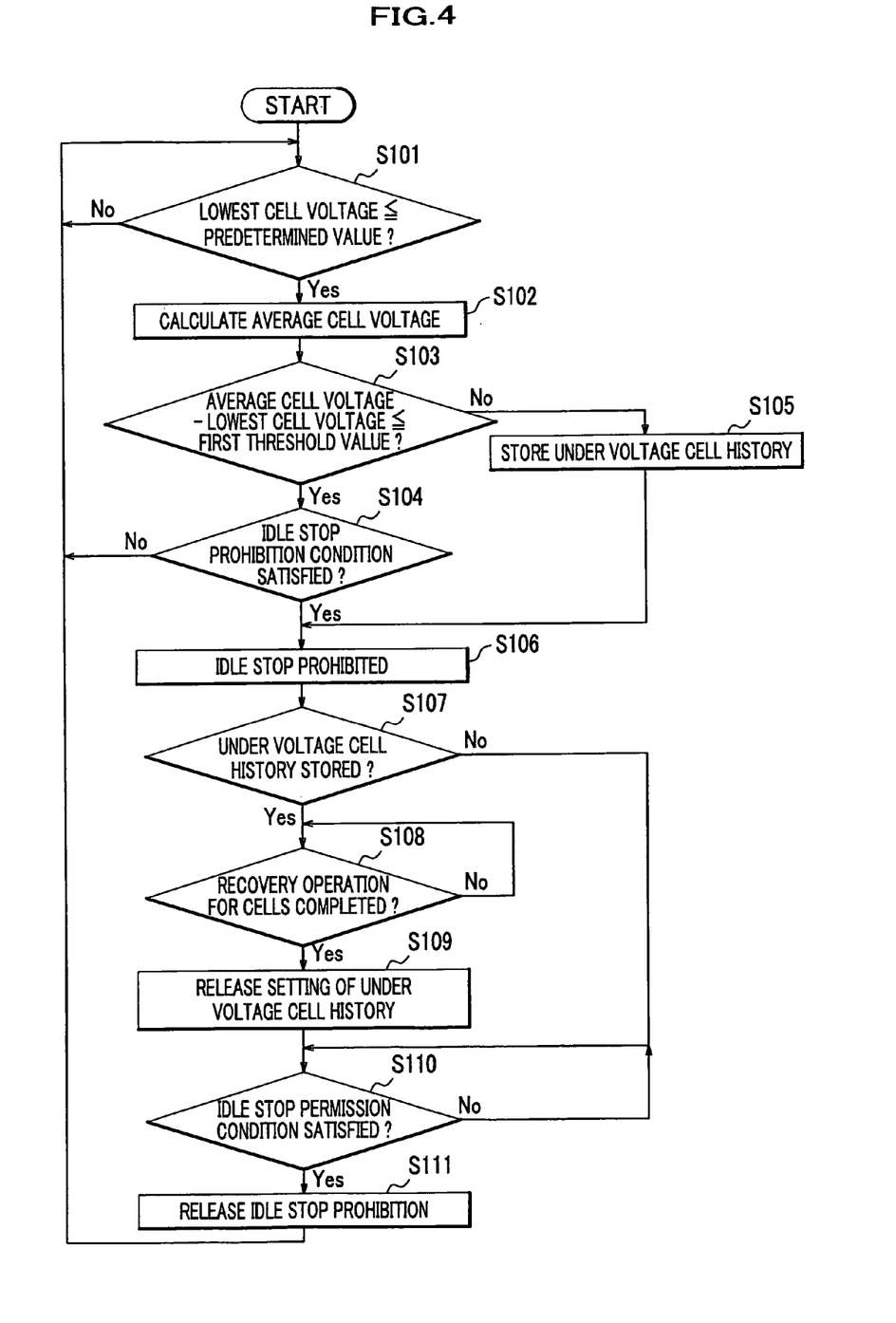
FIG. 4 is a flow chart explaining the method of controlling the fuel cell of FIG. 3.

Next, description will be given to one example of the operation wherein the difference (first voltage deviation) between the average cell voltage of the fuel cell 102 and the lowest cell voltage is calculated, and if the difference is more than the first threshold value, the idle stop is prohibited. FIG. 4 is a flow chart explaining the method of controlling the fuel cell 102.

This flow chart can be adapted to both cases where the vehicle stops and where the vehicle is running.

Detection of Lowest Cell Voltage

It is necessary that the fuel cell system 101 is ready to stop idling. It is not a problem whether the fuel cell system 101 has actually stopped idling, but it is necessary that certain conditions have been satisfied to stop idling of the fuel cell system 101.

The cell voltage detecting unit 182 compares each of the cell voltages transmitted from the cell voltage detector 103, detects a single cell having the lowest voltage value, and obtains the voltage value (lowest cell voltage) of this cell. The cell voltage detecting unit 182 determines whether the lowest cell voltage is not more than the predetermined value (lowest cell voltage≦predetermined value) (S101). If the lowest cell voltage is not more than the predetermined value (S101; Yes), the cell voltage detecting unit 182 sends an order for calculating the average cell voltage to the average cell voltage calculating unit 181, and transmits the lowest cell voltage to the voltage difference calculating unit 183. If the lowest cell voltage is more than the predetermined value (S101; No), the operation in step S101 is repeated.

Calculation of Average Cell Voltage

The average cell voltage calculating unit 181 then sums up all the cell voltages obtained by the cell voltage detector 103, and divides the total value by the number of whole single cells in the fuel cell 102 to calculate the average cell voltage (S102).

Calculation of Voltage Difference

The voltage difference calculating unit 183 then calculates the expression defined by: (the average cell voltage)−(the lowest cell voltage). The obtained value is hereinafter called as the voltage difference (first voltage deviation).

Determination of Idle Stop Prohibition; Storage of Under Voltage Cell History

Next, the idle stop prohibition condition determining unit 184 determines whether the voltage difference is not more than the first threshold value (predetermined value) (first voltage difference≦first threshold value) (S103). If the voltage difference is more than the first threshold value (S103; No), the idle stop prohibition condition determining unit 184 determines that the cell voltage has lowered because of Cause 1, and transmits whether or not a cell indicating voltage drop exists (under voltage cell history) to the under voltage cell history storage unit 186. This is because, of all the single cells, only a small number of single cells indicate low voltage values due to product water covering on the surface of the electric poles, and therefore, if these values are added to the other voltage values and divided for the calculation of the average voltage value, the obtained average voltage value does not indicate a remarkable voltage drop. In step S105, the idle stop prohibition condition determining unit 184 makes the under voltage cell history storage unit 186 store the under voltage cell history, and the operation proceeds to step S106.

If the voltage difference is not more than the first threshold value (S103; Yes), the idle stop prohibition condition determining unit 184 determines that the cell voltage has lowered because of Cause 2, and the operation proceeds to step S104. This is because the voltage drop due to electric charge to the electricity storage means 172 commonly appears on each of the single cells, and therefore even if the average voltage value is calculated from all the voltage values, it can indicate a value as close as each single cell.

According to this embodiment, if the voltage difference is more than the first threshold value (first voltage difference>first threshold value), the operation proceeds to step S105, and if the voltage difference is not more than the first threshold value (first voltage difference≦first threshold value), the operation proceeds to step S104. However, it is possible that the operation proceeds to step S105 if the voltage difference is not less than the first threshold value (first voltage difference≧first threshold value), and the operation proceeds to step S104 if the voltage difference is less than the first threshold value (first voltage difference≦first threshold value).

The control unit 185 then determines whether or not any of the idle stop prohibition conditions is satisfied (S104). To be more specific, the idle stop prohibition conditions include, for example, "the output of the accelerator pedal AP is detected". For this reason, the control unit 185 receives information on the state of the accelerator pedal AP, etc. in step S104. If the control unit 185 determines that any of the idle stop prohibition conditions is satisfied (S104; Yes), the operation proceeds to step S106. If the control unit 185 determines that none of the idle stop prohibition condition is satisfied (S104; No), the operation then proceeds to step S101.

Execution of Idle Stop Prohibition

In step S106, the control unit 185 prohibits the idle stop. To be more specific, the control unit 185 sends an order to the shut-off valve 142 and the compressor 161, respectively, and controls them to continuously supply the reaction gas. Thereafter, the control unit 185 sends an order to the purge valve 151 and makes the purge valve 151 open to start purging. At the same time, the clock 187 in ECU 180 starts to count time. The operation then proceeds to step S107. It should be noted that purging is not essential.

Determination of Fuel Cell State

In step S107, the control unit 185 determines whether or not the under voltage cell history is stored in the under voltage cell history storage unit 186. If the under voltage cell history is not stored in the under voltage cell history storage unit 186 (S107; No), the control unit 185 determines that the cell voltage has lowered because of Cause 2, and the operation proceeds to step S110. This means that if the under voltage cell history is not stored in the under voltage cell history storage unit 186, the idle stop prohibition condition determining unit 184 determined "Yes" (Cause 2) in step S103. If the under voltage cell history is stored in the under voltage cell history storage unit 186 (S107; Yes), the control unit 185 determines that the cell voltage has lowered because of Cause 1, and the operation proceeds to step S108. This means that if the under voltage cell history is stored in the under voltage cell history storage unit 186, the idle stop prohibition condition determining unit 184 determined "No" (Cause 1) in step S103.

In step S108, the control unit 185 determines whether or not the recovery operation for the single cells that is carried out in step S106 has been completed. To be more specific, the control unit 185 determines whether or not a predetermined time has expired from when the clock 187 started to count time in step S106. The predetermined time is set, for example, from the start of purging to the end of purging.

If the control unit 185 determines that the recovery operation for the cells has not been completed (S108; No), the operation returns to step S108. If the control unit 185 determines that the recovery operation has been completed (S108; Yes), the operation then proceeds to step S109.

Deletion of Under Voltage Cell History

In step S109, the control unit 185 deletes the under voltage cell history that has been stored in the under voltage cell history storage unit 186 in step S105. The operation then proceeds to step S110.

Determination of Idle Stop Permission Conditions

In step S110, the control unit 185 determines whether or not any of the idle stop permission conditions is satisfied. To be more specific, the idle stop permission condition is satisfied if the output of the accelerator pedal AP is not detected or purging has been completed.

In step S110, if the control unit 185 determines that any of the idle stop permission conditions is satisfied (S110; Yes) the operation proceeds to step S111.

In step S110, if the control unit 185 determines that none of the idle stop permission conditions is satisfied (S110; No) the operation returns to step S110.

Release of Idle Stop Prohibition

In step S111, the control unit 185 makes the shut-off valve 142 and the compressor 161 ready to release the prohibition of idling stop, that is, to permit idling stop. The operation then returns to step S101.

While the present invention has been described with reference to preferred embodiments thereof, it is to be understood that various changed and modifications may be made without departing from the spirit of the invention.

In the above embodiment, the average cell voltage is obtained by calculating the average value from all the cell voltages detected by the cell voltage detector 103 connected to each single cell. However, it is possible to detect the voltage value of the whole fuel cell 102 such that the obtained voltage value is divided by the number of single cells included in the fuel cell 102 to obtain the average cell voltage. The idle stop prohibition condition determining unit 184 may compare the difference (first voltage deviation) between the resulting average cell voltage and the lowest cell voltage with the first threshold value (predetermined value).

It is not necessary that the average cell voltage is calculated from cell voltages of all the single cells included in the fuel cell 102. For example, voltage may be detected for every other single cell, and the detected cell voltages may be averaged to calculate the average cell voltage. Alternatively, the average cell voltage may be calculated from an arbitrary number of plural single cells such that voltage values of the arbitrary single cells are averaged to calculate the average cell voltage.

Further, it may be possible to detect a single cell having the highest voltage value from the single cells in the fuel cell 102 and to obtain the cell voltage of this single cell as the highest cell voltage, so that the idle stop prohibition condition determining unit 184 can compare the difference (second voltage deviation) between the highest cell voltage and the lowest cell voltage with the predetermined value (second threshold value).

The lowest cell voltage may be obtained from a predetermined number of single cells having a low voltage value such that voltage values of these single cells are averaged. The highest cell voltage may also be obtained from a predetermined number of single cells having a high voltage value such that voltage values of these single cells are averaged.

Regardless of the lowest cell voltage, it may use voltage values (or a voltage value) lower than a predetermined value. Also, regardless of the highest cell voltage, it may use voltage values (or a voltage value) higher than a predetermined value.

It may be possible that each single cell is provided with one sell voltage detector 103. It is also possible that one cell voltage detector 103 is provided for an arbitrary number of single cells.

Accessories may include solenoid valves, a cooling-water pump, and a hydrogen pump so that the control unit 185 is electrically connected therewith and control the same.

The control unit 185 may be electrically connected to loads 171 and the electricity storage means 172. The control unit 185 may detect information on the state of loads 171 and the amount of stored electricity of the electricity storage means 172, and based on the information the control unit 185 may carry out determinations on the idle stop prohibition conditions and the idle stop permission conditions to control opening and closing of the shut-off valve 142 and the rotational speed of the compressor 161.

In this instance, the idle stop prohibition conditions may include: (1) the output of the accelerator pedal AP is detected; or (2) the amount of stored electricity of the electricity storage means 172 is not more than a predetermined value, and a request amount for generating electricity from the loads 171 such as an air conditioner and/or a car navigation system is more than the predetermined value. The idle stop permission conditions may include: (1) the output of the accelerator pedal AP is not detected, and the amount of stored electricity is more than the predetermined value; (2) the output of the accelerator pedal AP is not detected, and the request amount for generating electricity from the loads 171 such as the air conditioner and/or the car navigation system is not more than the predetermined value; (3) purging has been completed; or (4) the reaction gas has been supplied to the fuel cell 102 to an amount larger than the normal supply amount for a certain period of time. As to the condition (4), supplying the reaction gas to an amount larger than the normal supply amount allows product water to be discharged from the fuel cell 102, which facilitates the next idle stop operation. The supply amount of the reaction gas can be set appropriately according to experiments or simulations.

According to this embodiment, the cell voltage detecting unit 182 monitors voltages of the single cells regardless of whether the vehicle is stopping or running. However, the cell voltage detecting unit 182 may only monitor the cell voltages during the stoppage of the vehicle or when the vehicle speed lowers under a predetermined value.

Further, in step S105 of FIG. 4, voltage drop of a single cell caused by product water covering on the electric poles is stored as the under voltage cell history. However, each single cell may be provided with an ID, and the cell voltage detector 103 can receive IDs as well as each of the cell voltages such that voltage value of a single cell indicating a lower voltage than a predetermined value and the ID of this single cell are stored as the under voltage cell history in the under voltage cell history storage unit 186.

According to this embodiment, whether the lowest cell voltage is not more than the predetermined value (lowest cell voltage$\leqq$predetermined value) is determined at the beginning. However, such a determination process may be executed between step S103 and step S104. In this instance, if the lowest cell voltage is not more than the predetermined value (lowest cell voltage$\leqq$predetermined value), the operation proceeds to step S104. If the lowest cell voltage is more than the predetermined value (lowest cell voltage>predetermined value), the operation returns to the beginning.

In step S108 of FIG. 4, whether the recovery operation for the fuel cell 102 has been completed is determined by the control unit 185 on the basis of the predetermined time elapsed. However, instead of providing the clock 187, it is possible to employ a counter for counting the number of purging. It is determined that the recovery operation for the fuel cell 102 is completed at the time when the count number exceeds a predetermined value.

What is claimed is:

1. A fuel cell system comprising:
   fuel gas supply means for supplying a fuel gas;
   oxidant gas supply means for supplying an oxidant gas;
   a fuel cell to which the fuel gas and the oxidant gas are supplied for generation of electricity;
   an idle stop means for stopping generation of electricity by the fuel cell to perform an idle stop; and
   an unstable state detection means for detecting whether the generation of electricity by the fuel cell is unstable, wherein if the unstable state detection means detects that the generation of electricity by the fuel cell is unstable, the idle stop by the idle stop means is prohibited so that the cell continues to generate electricity; and temperature sensing means for detecting an operation temperature of the fuel cell, wherein the unstable state detection means carries out a detection in accordance with the operation temperature of the fuel cell that is detected by the temperature sensing means and a first predetermined temperature under which generation of electricity by the fuel cell becomes unstable.

2. A fuel cell system according to claim 1, wherein the unstable state detection means determines that the generation of electricity is unstable if the operation temperature detected by the temperature sensing means is lower than the first predetermined temperature.

3. A fuel cell system according, comprising:
fuel gas supply means for supplying a fuel gas;
oxidant gas supply means for supplying an oxidant gas;
a fuel cell comprising a plurality of single cells to which the fuel gas and the oxidant gas are supplied for generation of electricity;
an idle stop means for stopping generation of electricity by the fuel cell to perform an idle stop;
an unstable state detection means for detecting whether the generation of electricity by cell is unstable, the generation of electricity by the fuel cell is unstable, the idle stop by the idle stop means is prohibited so that the fuel cell continues to generate electricity; and
voltage sensing means for detecting a voltage of each single cell of the plurality of single cells, wherein the unstable state detection means calculates a first voltage deviation that is a deviation between the voltage of one single cell having a low voltage and an average voltage of the single cells, and determines that the generation of electricity is unstable if the first voltage deviation is more than a first threshold value.

4. A fuel cell system, comprising:
fuel gas supply means for supplying a fuel gas;
oxidant gas supply means for supplying an oxidant gas;
a fuel cell comprising a plurality of single cells to which the fuel gas and the oxidant gas are supplied for generation of electricity;
an idle stop means for stopping generation of electricity by the fuel cell to perform an idle stop; and
an unstable state detection means for detecting whether the generation of electricity by the fuel cell is unstable;
wherein if the unstable state detection means detects that the generation of electricity by the fuel cell is unstable, the idle stop by the idle stop means is prohibited so that the fuel cell continues to generate electricity; and
voltage sensing means for detecting a voltage of each single cell of the plurality of cells, wherein the unstable state detection means calculates a second voltage deviation that is a deviation between a voltage of one single cell having the highest voltage and a voltage of one single cell having the lowest voltage, and determines that the generation of electricity is unstable if the second voltage deviation is more than a second threshold value.

5. A fuel cell system according to claim 3, further comprising electricity storage means for storing electric power generated by the fuel cell, wherein the electricity storage means stores electric power from the fuel cell if voltage of the electricity storage means is lower than voltage of the fuel cell.

6. A fuel cell system according to claim 5, wherein the electricity storage means comprises a capacitor.

7. A fuel cell system according to claim 4, further comprising electricity storage means for storing electric power generated by the fuel cell, wherein the electricity storage means stores electric power from the fuel cell if a voltage of the electricity storage means is lower than a voltage of the fuel cell.

8. A fuel cell system according to claim 7, wherein the electricity storage means comprises a capacitor.

9. A fuel cell system according to claim 1, wherein the prohibition of the idle stop is released at a time when generation of electricity by the fuel cell becomes stable.

10. A fuel cell system, comprising:
fuel gas supply means for supplying a fuel gas;
oxidant gas supply means for supplying an oxidant gas;
a fuel cell to which the fuel gas and the oxidant gas are supplied for generation of electricity;
an idle stop means for stopping generation of electricity by the fuel cell to perform an idle stop; and
an unstable state detection means for detecting, whether the generation of electricity by the fuel cell is unstable;
wherein if the unstable state detection means detects that the generation of electricity by the fuel cell is unstable, the idle stop by the idle stop means is prohibited so that the fuel cell continues to generate electricity, and the generation of electricity is determined as stable at a time when a predetermined time elapses after the prohibition of the idle stop is carried out.

11. A fuel cell system, comprising:
fuel gas supply means for supplying a fuel gas;
oxidant gas supply means for supplying an oxidant gas;
a fuel cell to which the fuel gas and the oxidant gas are supplied for generation of electricity;
an idle stop means for stopping generation of electricity by the fuel cell to perform an idle stop; and
an unstable state detection means for detecting whether the generation of electricity by the fuel cell is unstable;
wherein if the unstable state detection means detects that the generation of electricity by the fuel cell is unstable, the idle stop by the idle stop means is prohibited so that the fuel cell continues to generate electricity, and the generation of electricity is determined as stable at a time when a predetermined number of purging is carried out after the prohibition of the idle stop is carried out.

12. A fuel cell system, comprising:
fuel gas supply means for supplying a fuel gas;
oxidant gas supply means for supplying an oxidant gas
a fuel cell to which the fuel gas and the oxidant gas are supplied for generation of electricity;
an idle stop means for stopping generation of electricity by the fuel cell to perform an idle stop; and
an unstable state detection means for detecting whether the generation of electricity by the fuel cell is unstable;
wherein if the unstable state detection means detects that the generation of electricity by the fuel cell is unstable, the idle stop by the idle stop means is prohibited so that the fuel cell continues to generate electricity, and the generation of electricity is determined as stable at a time when an operation, by which at least one of the fuel gas and the oxidant gas is supplied to the fuel cell to an amount larger than a normal supply amount, is carried out for a predetermined period of time after the prohibition of the idle stop is carried out.

13. A fuel cell system according to claim 1, wherein the fuel cell is mounted on a fuel cell mounted movable body which is driven by electric power of the fuel cell.

* * * * *

UNITED STATES PATENT AND TRADEMARK OFFICE
CERTIFICATE OF CORRECTION

PATENT NO.        : 7,618,728 B2                                              Page 1 of 1
APPLICATION NO. : 11/264933
DATED             : November 17, 2009
INVENTOR(S)       : Igarashi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1050 days.

Signed and Sealed this

Twenty-sixth Day of October, 2010

David J. Kappos
*Director of the United States Patent and Trademark Office*